United States Patent [19]

Panenka et al.

[11] 4,317,033

[45] Feb. 23, 1982

[54] GAMMA RAY PROSPECTING SYSTEM

[75] Inventors: Jaroslav R. Panenka, Calgary; Bohuslav Pavlik; Daniel P. Olson, both of Ottawa, all of Canada

[73] Assignees: Kenting Earth Sciences Limited, Ottawa; Hudson's Bay Oil and Gas Company Limited, Calgary, both of Canada

[21] Appl. No.: 95,101

[22] Filed: Nov. 16, 1979

[30] Foreign Application Priority Data

Jun. 15, 1979 [CA] Canada .................................. 329844

[51] Int. Cl.³ .......................... G01V 5/00; G01T 1/20
[52] U.S. Cl. .................................... 250/253; 250/255; 250/369
[58] Field of Search .............. 250/252, 253, 255, 336, 250/361 R, 366, 369

[56] References Cited

U.S. PATENT DOCUMENTS

| | | | |
|---|---|---|---|
| 3,105,149 | 9/1963 | Guitton et al. | 250/253 |
| 3,825,751 | 7/1974 | Johnson, Jr. et al. | 250/253 |
| 3,976,878 | 8/1976 | Chevalier et al. | 250/253 |
| 4,059,762 | 11/1977 | Horrocks | 250/369 |
| 4,158,769 | 6/1979 | Smith | 250/255 |

Primary Examiner—Alfred E. Smith
Assistant Examiner—Janice A. Howell
Attorney, Agent, or Firm—Spencer & Kaye

[57] ABSTRACT

A means and method for distinguishing full energy absorption peaks from background energy in a gamma ray prospecting system. Photopeaks in the received energy spectrum are determined, and boundaries to the peaks are located. The energy within the boundaries assuming a predetermined curve between the boundaries is integrated. The filtered energy within the actual photopeak curve is also integrated, and the two integrated signals are subtracted to provide a signal representative of the net photopeak area or amplitude. This peak area (or amplitude) is directly proportional to intensity of gamma radiation due to uranium, thorium and potassium in the ground. This signal is displayed and continuously updated on a cathode ray tube as a function of time.

18 Claims, 5 Drawing Figures

4,317,033

GAMMA RAY PROSPECTING SYSTEM

BACKGROUND OF THE INVENTION

This invention relates to an aerial prospecting system, and particularly to a radioactive material prospecting system.

Prospecting for radioactive materials usually involves scanning a particular land area from the air with a gamma ray spectrometer for the detection of gamma rays from radioactive material. Systems in common use utilize NaI crystals which release photons of energy upon gamma rays colliding with their atoms. These photons are detected in photomultiplier tubes, and the resulting output signals can be used to indicate the intensity of the gamma ray emissions.

Such systems utilize altimeters to record the height of the airplane from the ground, real time clocks which, used in conjunction with the known velocity of the airplane, can provide an indication of the location of any anomaly, etc.

Such systems typically group the energy spectrum into energy windows (which, in gamma spectrometry is a group of energy channels, typically over 127) and record on paper by pen chart and/or on magnetic tape the intensity of the gamma rays within each of the energy spectrum windows.

Such systems have encountered particular problems. For example gamma rays have been found to be emitted from the earth itself, which are not particularly related to a concentrated source of radioactive material such as uranium. This background radiation which is caused by gamma rays scattered in the ground, air or within the NaI crystal itself is called "Compton background" and is generally taken into account as being a constant proportion of counts in higher energy windows. It is known, however, that the Compton background radiation varies with variations in the amount of matter between the source of gamma rays and the detector.

As the spectrometer scans a given area, the geophysicist looks for anomalies in the energy windows of the received spectrum. These anomalies are generally manifested by an increase in amplitude above the Compton background at particular energy windows within the spectrum. The time of persistence, and the peak amplitude or area which is detected above the Compton background allows the geophysicist to estimate the size and concentration of the radioactive anomaly.

Particular spectrogram windows have been identified in the past as containing evidence of radioactive material. For instance, uranium, thorium, potassium, are all natural radioactive elements which emit gamma rays within different window areas of a spectrogram.

As the gamma rays collide with the NaI crystal, a certain proportion may be scattered and do not spend all their energy within the NaI crystal. Also some gamma rays have previously interacted with atoms in the rock or soil, thus losing part of their energy and do not enter the crystal with their original energy. The gamma rays which did not lose all their energy within the crystal create Compton background and the number of counts of Compton background increases with decreasing energy level and with the amount of mass between the radioactive source and the detector.

Gamma rays which lose all their energy within the crystal manifest themselves in the spectrum as "photopeaks" with the photopeak amplitude (or areas below a graphical plot of the photopeak) being proportional to the intensity of the particular gamma rays at their location in the spectrum corresponding to their energy.

Compton background can therefore be considered as "noise", while photopeaks represent "signal". One of the most important tasks of airborne gamma spectrometry is to separate photopeak signals from Compton noise.

The various channels of energy level which are recorded must therefore be corrected for the everpresent Compton background. This process normally utilizes a correction technique called Compton stripping.

It has been found that while previous correction techniques takes Compton background as a constant, that Compton background is actually variable, and, according to prior art techniques, may mask photopeaks of main interest. Accordingly prior art Compton background "stripping" techniques have caused the geophysicist to make, in many instances, erroneous conclusions as to the presence of radioactive anomalies. It has been found that if Compton background correction is treated as a constant as in the prior art, it can create false anomalies or obliterate real ones.

The present invention provides a new apparatus and an improved process for obtaining indications of photopeaks which were previously removed during above mentioned Compton stripping technique.

BRIEF DESCRIPTION OF THE PRIOR ART

Prior art systems attempt to alleviate problems in detection of photopeaks using the following techniques, for example. For low count rate but with high statistical fluctuations, a brute force method of using larger crystal detector volumes is used. From a standard 200 cubic inch crystal mass used during the 1960's, presently crystal masses of 2000–6000 cubic inches are used, weighing 450–1200 pounds, and costing up to ¼ million dollars. Of course larger aircraft or helicopters must be used for the survey, increasing the survey cost substantially. However, this approach still does not solve the basic problem of the variability of Compton corrections.

A prior art approach for detecting energy anomalies has consisted of the following three steps:

(a) all of the photon counts in the energy band (window) which covers the $Bi^{214}$ photopeak at 1.76 MeV is summed;

(b) some constant portion of counts occurring in the $Tl^{208}$ window at 2.615 MeV (which is assumed to be the value of Compton background in the $Bi^{214}$ window, and therefore the general Compton correction,) is subtracted from the aforenoted sum. The net $Bi^{214}$ window count, i.e., the area of the $Bi^{214}$ photopeak is thus assumed to be the result.

This operation involves subtraction of two widely fluctuating numbers of similar magnitude, varying in a largely unpredictable manner. It has been found that the signal to be detected is almost always smaller than the corrections which must be applied. A slight imbalance in the detection or signal processing instruments may seriously damage or destroy the data.

The problem of variable Compton background appears to be solved for the first time utilizing the present invention.

SUMMARY OF THE INVENTION

According to the present invention an energy window is defined in a high resolution spectrum, and the values of Compton background at the edges of the window are determined. An integration of the energy defined by the energy levels at the edges of the window is thus made.

The entire energy below the photopeak within this same window is integrated, and the results of the two integrated energy values are subtracted. This difference provides an indication of the integrated energy which is higher than the Compton background radiation and below the photopeak window the window.

This system utilizes the full energy spectrum, (typically over 127 channels) rather than as in prior art systems, breaking the spectrum down into three or four large windows. With use of the full spectrum, the desired window can easily be defined.

To make the spectrum suitable for direct viewing, and to obtain the integrated value of Compton energy, the received signal is passed through a filter having for example the transfer characteristic $$\frac{K_0 A_N + K_1(A_{N+1} + A_{N-1}) + K_2(A_{N+2} + A_{N-2}) + K_3(A_{N+3} + A_{N-3})}{K_0 + 2(K_1 + K_2 + K_3)}$$

where
$A_N$ is the received energy level in a particular window,
N is the window number and
$K_0$, $K_1$, $K_2$, and $K_3$ are constants.

With continuous processing of the received gamma ray signals, the resulting photopeak energy then can be constantly displayed as a bar chart or graph on an energy spectrum forming the time base on a cathode ray tube, and can further recorded on a printer. The entire operating system can be carried by the survey aircraft, and the resulting photopeaks in the filtered spectrum watched on the cathode ray tube by a geophysicist as the survey is made. Since some regions of the country to be scanned are only accessible during a very few months of the year, clearly the ability to separate real anomalies from a large number of statistical and other spurious anomalies, and to return immediately to an intersecting region can save substantial amounts of time and money.

In general, the invention is means for distinguishing energy absorption peaks received across an energy band from background energy at a particular physical location comprising: means for receiving a gamma ray energy spectrum of radiation, means for distinguishing the peak energy level with an energy band of said spectrum, and for integrating said energy within said band, means for distinguishing a statistical value of the background gamma radiation within said band, and for integrating the background radiation within said band, means for subtracting the integrated statistical value of background energy from the integrated peak energy, and means for providing an output signal representative of the difference of the integrated peak energy level and said integrated statistical value within said band, to provide an indication of the presence of radiation emissive mineral at said particular location.

INTRODUCTION OF THE DRAWINGS

A better understanding of the invention will be obtained by reference to the detailed description below, and to the following drawings, in which.

DESCRIPTION OF THE INVENTION

Figure 1:
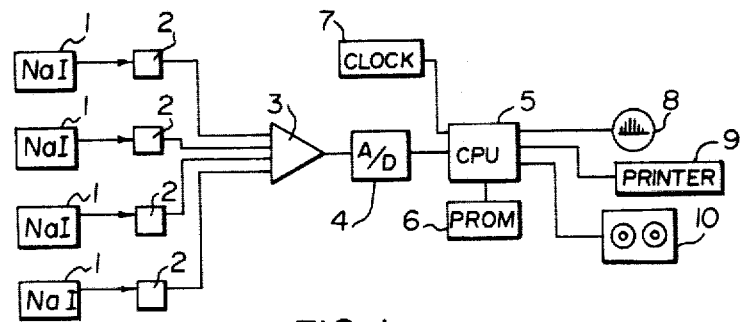
FIG. 1 is a block schematic of the invention.

A block schematic of a preferred embodiment of the invention is shown in FIG. 1. The apparatus is comprised of a spectrometer which includes a plurality of commercial NaI crystals 1 adapted to receive gamma rays from a radioactive source. Each is coupled to a photomultiplier tube 2. The output of each photomultiplier tube is connected to an input of a summing amplifier 3. The output of the summing amplifier is connected to the input of an analog-to-digital (A/D) converter 4, which has its own output connected to a microcomputer, particularly to the data input of a central processing unit (CPU)5.

It is preferred that as high a resolution of the received spectrum should be obtained as possible, and a system utilizing 256 spectra channels has been found to be adequate.

The central processing unit 5 is connected to a memory 6, and to a clock 7 in a well known manner. The A/D converter which was used in one successful prototype was Nuclear Data type MD571ADC. A central processing unit which was used in Technico International type TMS9900-SS, and memory which was used is Technico International type 9900-MA.

An oscilloscope, such as Hewlett Packard type 1332A should be connected to the output of the central processing unit. It is also desirable to have a printer such as Axiom type EX-800 connected to the output of the central processing unit, and also a magnetic tape recorder.

The structure, operation and physical interconnection of the analog-to-digital converter, the central processing unit, the memory, the clock, the oscilloscope, the printer, and the magnetic tape recorder are specified by the equipment manufacturers, and since a repetion of that material would be redundant, and/or are well known to persons skilled in the art, they will not be described in detail.

The memory which is preferred to be used with the apparatus is a programmable read-only memory (PROM) which is a permanent memory utilizing a plurality of storage elements which are interconnected using a permanent scheme of metallic conductors or semiconductors which are analogous to a permanent plug board which interconnects the the functional blocks of the CPU. Accordingly the memory forms a physical integral portion of the central processing unit to form a special purpose computer which is unalterable by the particular signals being applied thereto.

Since the special purpose nature of the computer is dependent on the structure of the memory, which causes the central processing unit, besides controlling its ancillary apparatus, to operate upon the arrival of electronic signals as particular kinds of functional electronic apparatus, an understanding of the operation of the memory is important to an understanding of the invention and it will be described in more detail.

Figure 2:
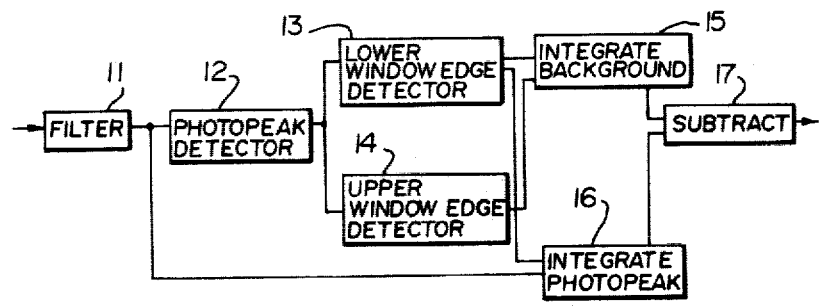
FIG. 2 is a flow chart of operation of the special purpose computer used in this invention.
Figure 3:
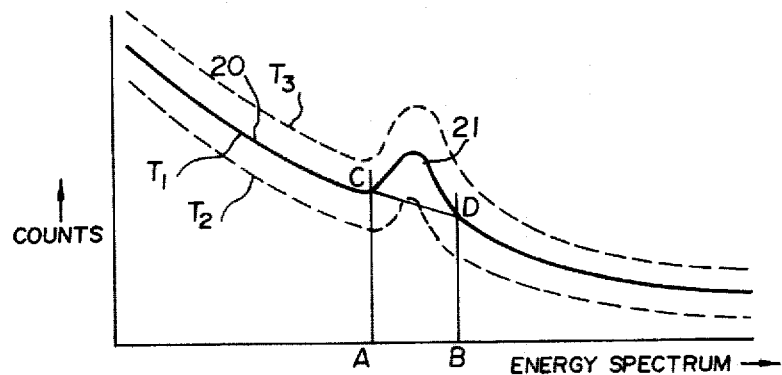
FIG. 3 is a graph of a typical gamma ray energy spectrum.

FIG. 2 depicts a flow chart of how the arriving signals from the A/D converter are treated by the CPU-PROM combination, in one embodiment of the invention. The signals are applied to a filter 11. After processing in the filter, the photopeak is detected in photopeak detector 12, and then applied to a lower spectrum window edge detector 13 and an upper spectrum window edge detector 14 (the window edges being CA and DB respectively in FIG. 3). The signal amplitudes at the edges of the window (at C and D in FIG. 3), that is, as defined by the lower and upper window edge detectors are used as area boundaries and after processing in an integrator 15 the Compton background area ACDB of the energy within the window is obtained.

With the definition of the window edges the signal 20 including the entire photopeak 21 signal area between the window boundaries CA and DB is integrated in an integrator 16.

The signal outputs of integrators 15 and 16 are subtracted in a subtracting means 17 to obtain the net photopeak area, which is the desired signal representative of the photopeak energy above the Compton background. This signal is applied to a displaying means such as a cathode ray tube which preferably has a time base calibrated according to the spectrum scan, and an ordinate which represents the net photopeak energy. In this manner a bar chart of gamma ray energy across the spectrum can be dynamically displayed on the oscilloscope on an on-line basis.

Preferably the scan of the spectrometer and output display on the oscilloscope is about once per second (with appropriate refresh cycles to eliminate flicker on the oscilloscope). The geophysicist can thus watch the display of the filtered spectrum as the airplane scans, and short-term anomalies caused by e.g. a small uranium source, can be distinguished from a large number of Compton stripping related anomalies as well as anomalies of statistical and spurious origin, which previously caused serious interference and increased the cost of the exploration program. A closer scan can thus be ordered to examine the anomaly of interest.

It is also preferred that at the same time the printer should permanently record the signals applied to the oscilloscope, and the signals themselves should be recorded on the magnetic tape recorder 10.

Considering the apparatus described above in more detail, the filter should be of the low-pass type, although bandpass filtering could be used as the nature of the signals dictate. It is preferred that the central processing unit should perform the filtering, utilizing a symmetrical convolution filter, which, in simple form, can be a moving average filter utilizing 5 or 7 points, for example. A recursive filter could also be used, and appears to have particular signal processing advantages.

A filter which was found to operate satisfactorily has the transfer characteristic $$\frac{K_0 A_N + K_1(A_{N+1} + A_{N-1}) + K_2(A_{N+2} + A_{N-2}) + K_3(A_{N+3} + A_{N-3})}{K_0 + 2(K_1 + K_2 + K_3)}$$

where $A_N$ is the received energy level in a particular window,

N is the window number and $K_0 = 1.0$
$K_1 = 0.9$
$K_2 = 0.75$ and
$K_3 = 0.5$.

However, the particular filter which is used has been found to be not very critical.

After filtering, the central processing unit should locate the signal photopeaks. The peak maxima are located in the preferred embodiment by finding those input channels where the counts fulfil the conditions $$y(p - 2) < y(p) - \sqrt{y(p)}$$

$$\text{and } y(p + 2) < y(p) - \sqrt{y(p)}$$

The border channels of the peak, P−1 and P+1 are determined:

$$y(p - l - 1) \geq y(p - l) - \sqrt{y(p - l)}$$

$$y(p + r + 1) \geq y(p + r) - \sqrt{y(p + r)}$$

The peaks are located by scanning for groups of channels such that the first derivitive, $E_i$ fulfills the following criteria $$E_i < 0; \ E_{i-1} > 0; \ E_{i-2} > 0$$

The restriction on channel i-2 assures that a peak will have at least two points on the lower energy side of the spectrum.

The CPU then checks whether the number of consecutive negative E values on the higher energy side of the photopeak is less than 4. If so, the peak is discarded.

The lower energy boundary is fixed where the first derivative changes sign, and the higher energy boundary is fixed where the first derivative changes sign on that side of the photopeak.

Once the boundaries of the spectrum window have been determined, the Compton background energy within the window can be determined in a number of ways. If the change in energy between the two boundary points is considered as being linear, the energy area forms a trapezoid. This is shown as area ACDB in FIG. 3. The energy within the area ACDB is determined by integration.

The line CD, however is more accurately a cubic, or even more accurately a smoothed polynomial curve.

It should be noted that the entire signal spectrum curve varies in amplitude with time, e.g., sequentially at times $T_1$, $T_2$, and $T_3$, the curves are at varying amplitudes. However it should be noted that the relative anomaly photopeak signal amplitude remains about the same with respect to the Compton background.

The entire area under the energy spectrum 20 which has been received within the window AB is also integrated. Following this the integrated signals determinative of the Compton background, and the entire area under the photopeak 21 within the window area are subtracted. The resulting signal is the net photopeak area which is the signal amplitude to be displayed, and is representative of the gamma ray emissions received by the spectrometer.

It should be noted that the assumption of a linear decrease in Compton background (line CD in FIG. 3), as noted above, is not strictly correct, since the Compton background curve is nonlinear. The line CD can also be obtained closer to the actual curve by fitting a spectrum amplitude cubic equation to the window points CD. The resulting equation for the net peak area differs from that of a linear base line method by the addition of a nonlinear correction term. The correction is about 1% when the base area is 1400 counts, and 1.5% for 30,000 counts.

If the base area (Compton background within the window) is small compared to the total peak area there are no significant differences between the different methods. For a peak of small intensity, it is preferred that a least-square curve be used preferably to a nonlinear base line, which in turn is preferable to a linear base line.

The structure of the PROM is best given in the shorthand of the PROM designer, which is in microcode and mnemonic. A listing of the code to fulfill the operation of the invention is attached as Appendix 1, and is specific for the central processing unit and memory noted earlier in this disclosure.

The resulting structure of the memory causes the central processing unit to operate as a special purpose computer to filter the input signal using a 5 point weighted average combined with a binary spacial filter. It also provides a five minute potassium photopeak accumulation with a peak position indication for semi-automatic spectrum stabilization. The remaining requirements for operation of the central processing unit, including control of the peripheral units, scanning of the input signals, etc., are available from the aforenoted CPU manufacturer and/or are known to persons skilled in the art, and will not be described in detail.

It is preferred that the system clock be manually started in order to provide an indication in real time of time of the scan from start at a particular physical location.

Rather than using the microprocessor as described, a person skilled in the art can design an electronic logic circuit using well-known techniques to perform the described functions.

Figure 4:
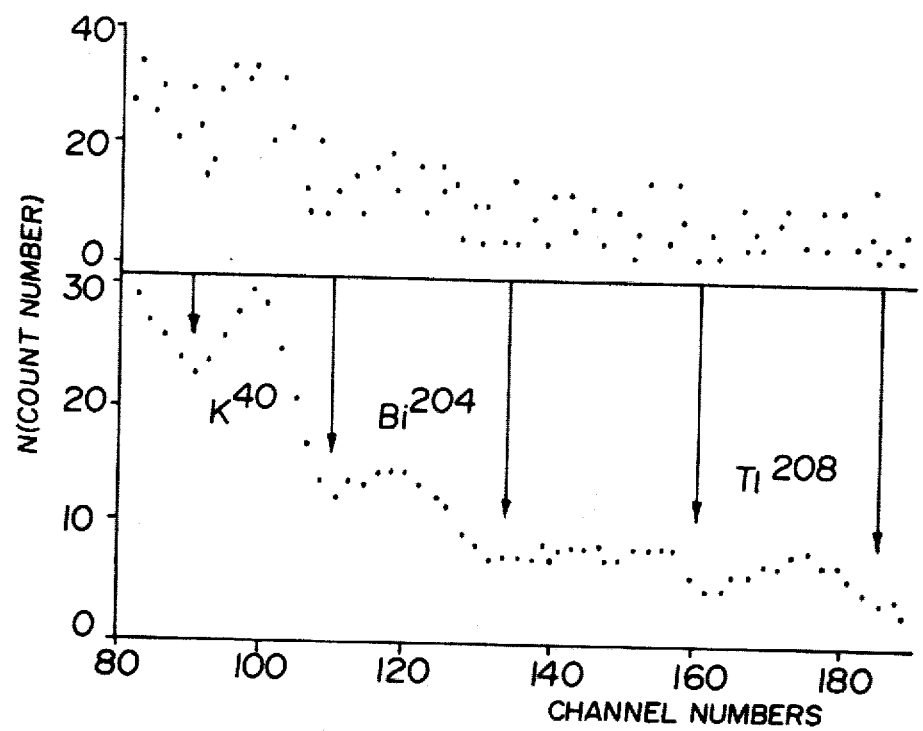
FIG. 4 is a pair of graphs of an unfiltered, and of a corresponding filtered gamma ray energy spectrum.

FIG. 4 consists of a pair of graphs which illustrate the advantages of the invention. In the top graph of FIG. 4, the unfiltered spectrum is shown, as a series of dots appearing virtually randomly scattered, having various counts for the particular channel numbers. The lower graph illustrates the spectrum after filtering. Peaks are noticeable for the energy region of $K^{40}$, $Bi^{204}$ and $Ti^{208}$. Uranium is normally associated with a peak in the $Bi^{204}$ window.

Figure 5:
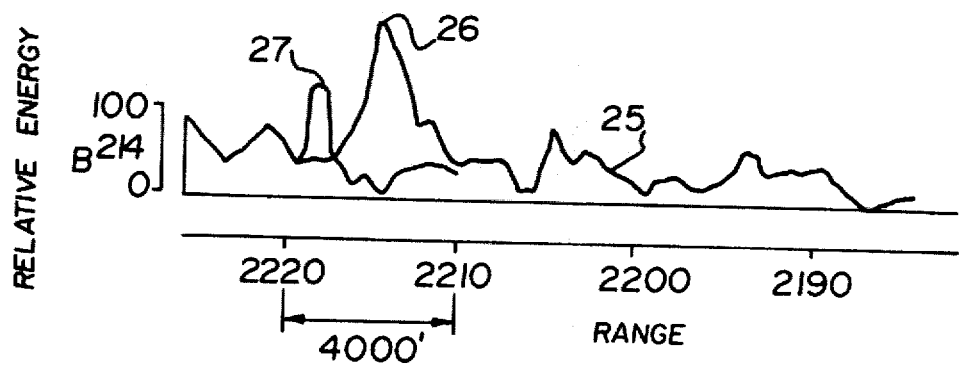
FIG. 5 is a graph of the photopeaks in a particular window of the gamma ray energy spectrum according to the prior art, and according to the present invention.

After filtering, the signals are processed as described above to obtain a net photopeak energy display, and the results for the $Bi^{204}$ window for a period of scan over about 16000 feet is shown in FIG. 5.

Curve 25 in FIG. 5 shows the signal amplitude after processing using prior art Compton stripping techniques mentioned earlier in this specification. It will be noted that a significant peak 26 is shown at about the 2214 marker point.

Utilizing the present invention, a gamma ray peak 27 is clearly shown at about the 2218 market point which was completely ignored by the Compton stripping technique. Further, the peak 26 has been shown to be a false anomaly.

Checking the physical locations closer has proven that the procedure which is basic to the invention described herein is significantly more accurate than the prior art Compton stripping technique, and the present apparatus used on an on-line basis saves signficant time and money of the geophysicist in checking false anomalies, and pinpointing more accurately, as the survey proceeds, locations of radioactive ore.

A person skilled in the art understanding the description may now conceive of other embodiments or modifications of this invention. All are considered within the sphere and scope of this invention as defined in the claims appended hereto.

APPENDIX I

```
0F32  C00B            SPFILT  MOV   11,0
0F34  0203 1800               LI    3,SPBUF2
0F38  0204 1802               LI    4,SPBUF2+2
0F3C  0205 2DBC               LI    5,SDB1
0F40  C573            SPF10   MOV   *3+,*5
0F42  05C3                    INCT  3
0F44  AD74                    A     *4+,*4+
0F46  05C4                    INCT  4
0F48  0285 2EBC               CI    5,SDB1+256
0F4C  11F9                    JLT   SPF10
0F4E  04C3                    CLR   3
0F50  C123 2EBC       SPF20   MOV   @SDB2(3),4
0F54  0A14                    SLA   4,1
0F56  A123 2EBC               A     @SDB2(3),4
0F5A  A123 2DBC               A     @SDB1(3),4
0F5E  0924                    SRL   4,2
0F60  C8C4 2EBC               MOV   4,@SDB2(3)
0F64  05C3                    INCT  3
0F66  0283 0100               CI    3,256
0F6A  11F2                    JLT   SPF20
0F6C  04C9            FILTER  CLR   9
0F6E  C0E9 2EBC       FIL10   MOV   @SDB240(9),3
0F72  C169 2EBE               MOV   @SDB242(9),5
0F76  C1E9 2EC0               MOV   @SDB244(9),7
0F7A  A169 2EC2               A     @SDB246(9),5
0F7E  A0E9 2EC4               A     @SDB248(9),3
```

```
0F82 39E0 0318        MPY   @F0,3
0F86 3960 031A        MPY   @F1,5
0F8A 39E0 031C        MPY   @F2,7
0F8E 6204             S     4,8
0F90 A206             A     6,8
0F92 1501             JGT   FIL20
0F94 04C8             CLR   8
0F96 0958      FIL20  SRL   8,5
0F98 CA48 110E        MOV   8,@SPBUF+4(9)
0F9C 05C9             INCT  9
0F9E 0289 00F8        CI    9,248      248=2(128-4)
0FA2 16E5             JNE   FIL10
0FA4 04C3      KDRIFT CLR   3
0FA6 C123 120C        MOV   @KDB(3),4
0FAA 0884             SRA   4,8
0FAC 68C4 120C        S     4,@KDB(3)
0FB0 A8E3 18E2        A     @SPBUF242Z6(3),@KDB(3)
0FB4 120C
0FB6 05C3             INCT  3
0FB8 0283 0024        CI    3,36
0FBC 16F4             JNE   KDRIFT+2
0FBE 04C3      KHIGH  CLR   3
0FC0 04C5             CLR   5
0FC2 0285 0024        CI    5,36
0FC6 130A             JEQ   KH20
0FC8 80E5 120C        C     @KDB(5),3
0FCC 1502             JGT   KH10
0FCE 05C5             INCT  5
0FD0 10F8             JMP   KHIGH+4
0FD2 C0E5 120C KH10   MOV   @KDB(5),3
0FD6 C205             MOV   5,8
0FD8 05C5             INCT  5
0FDA 10F3             JMP   KHIGH+4
0FDC 0203 0012 KH20   LI    3,18
0FE0 6203             S     3,8
0FE2 0318             SRA   8,1
0FE4 0204 01B7        LI    4,MESS2+2
0FE8 C808 1232        MOV   8,@KDRFT
0FEC 0288 0000        CI    8,0
0FF0 1134             JLT   KH40
0FF2 DD20 0334        MOVB  @PLSSGN,*4+
0FF6 06A0 F534 KH30   BL    @PINDEC
0FFA DD20 098B        MOVB  @DBUF+3,*4+
0FFE DD20 098C        MOVB  @DBUF+4,*4+
1002 0450             B     *0
                *
1004 C820 2D9E NPA    MOV   @NPAFLG,@NPAFLG  NET PEAK AREA CALCULATION?
1008 2D9E
100A 1327             JEQ   KH40             NO NET PEAK AREA CALC.
100C 04C6             CLR   6
100E 0207 0356        LI    7,KST
1012 0208 35C4        LI    8,WINDOW+2
1016 C077      NFA10  MOV   *7+,1            R1=N1
1018 C241             MOV   1,9              R9=N1
101A A060 1232        A     @KDRFT,1         R1=N1+KDRFT
101E 0A11             SLA   1,1              DOUBLE FOR OFFSET
1020 C0E1 17FF        MOV   @SPBUF-1(1),3
1024 A0E1 1800        A     @SPBUF+0(1),3
1028 A0E1 1801        A     @SPBUF+1(1),3    R3=SUM OF 3 CHANLS CENTERED AT N1
102C C0B7             MOV   *7+,2            R2=N2
102E C282             MOV   2,10             R10=N2
1030 A0A0 1232        A     @KDRFT,2         R2=N2+KDRFT
1034 C122 17FF        MOV   @SPBUF-1(2),4
1038 A122 1800        A     @SPBUF+0(2),4
103C A122 1801        A     @SPBUF+1(2),4    R4=SUM OF 3 CHANLS CENTERED AT N2
1040 6289             S     9,10
1042 058A             INC   10               R10=N2-N1+1
1044 A103             A     3,4              R4=(C1+C2)/2(3)
1046 390A             MPY   10,4
1048 0815             SRL   5,1              R5=(N2-N1+1)(C1+C2)/2(3)
104A 04C4             CLR   4
104C 3D20 0320        DIV   @N3,4
1050 6E04             S     4,*B1
1052 0586             INC   6
```

```
1054 0286 0003        CI    8,3
1058 16DE             JNE   NP010
                *
105A 0748      KH40   ABS   8
105C DD20 0332        MOVB  @MINSGN,*4+
1060 10CA             JMP   KH30
                *
1062 C0E0 120A GRDSP  MOV   @GRPTR,3
1066 04C7             CLR   7               OLD VALUE
1068 C235      DGR10  MOV   *5+,8           8=NEW
106A 8808 031E DGR11  C     8,@GRFS         GRAPH FULL SCALE VALUE
106E 1511             JGT   DGR30
1070 81C8             C     8,7             COMPARE NEW/OLD
1072 1308             JEQ   DGR20
1074 61C8             S     8,7
1076 0507             NEG   7
1078 0247 83FF        ANDI  7,>83FF         SET UP GRAPHICS
107C 0267 0400        ORI   7,>0400
1080 CCC7             MOV   7,*3+
1082 C1C8             MOV   8,7             STORE OLD
1084 CCE0 033E DGR20  MOV   @GRPOS,*3+
1088 8185             C     5,6             FINISHED?
108A 16EE             JNE   DGR10           NO
108C C803 120A        MOV   3,@GRPTR
1090 045B             B     *11             YES
1092 6220 031E DGR30  S     @GRFS,8
1096 022B FEFE        AI    8,-1
109A 10E7             JMP   DGR11
                *
                ***********************************
                *  STORE ALL THE RAM BUFFERS HERE  *
                ***********************************
                *
109C           SPS    BSS   2
109E           SPE    BSS   2
10A0           ARCHN  BSS   2
10A2           INTERV BSS   2               SPS TO INTERV SEG. LOAD
10A4           ADF    BSS   2               FIRST AD CHANNEL FLAG
10A6           BASE1  BSS   24
10BE           BUL    BSS   2
10C0           BLKN   BSS   10
10CA           CHRTBF BSS   30
10E8           CRTTB  BSS   30
1106           EOLF   BSS   2               END OF LINE FLAG
1108           EOTF   BSS   2               END OF TAPE FLAG
110A           FSPBUF BSS   256
120A           GRPTR  BSS   2
120C           KDB    BSS   38              POTASSIUM DRIFT BUFFER
1232           KDRFT  BSS   2               BINARY POTASSIUM DRIFT STORED HE
1234           LASTLF BSS   2
1236           LASTRF BSS   2
1238           LNF    BSS   2               ON LINE FLAG
123A           MCA    BSS   2
123C           MORF   BSS   2
123E           MWC    BSS   2
1240           MTUB1  BSS   3500
1FEC           MTUB2  BSS   3500
2D98           MTUTRY BSS   2
2D9A           NCATCH BSS   2
2D9C           NEGFLG BSS   2
2D9E           NEAFLG BSS   2
2DA0           NFF    BSS   2
2DA2           SCALE1 BSS   24
2DBA           SCANUM BSS   2
2DBC           SDB1   BSS   256
2EBC           SDB2   BSS   256
2FBC           SDB3   BSS   256
30BC           LSFN   BSS   2
30BE           TCHBUF BSS   5000
35BE           EMASK  BSS   2
35C0           TMPEND BSS   2
35C2           WINDVL BSS   8
35CA           ADBUF  BSS   16
35DA           SPESTR BSS   512
                *
                *
37DA                  END
```

I claim:
1. Means for distinguishing full energy absorption peaks received across an energy band from background energy at a particular physical location comprising:
   (a) means for receiving a gamma ray energy spectrum of radiation,
   (b) means for distinguishing the peak energy level within an energy band of said spectrum, and for integrating said energy within said band,
   (c) means for distinguishing a statistical value of the background gamma radiation within said band, and for integrating the background radiation within said band,
   (d) means for subtracting the integrated statistical value of background energy from the integrated peak energy, and
   (e) means for providing an output signal representative of the difference of the integrated peak energy level and said integrated statistical value within said band, to provide an indication of the presence of radiation emissive mineral at said particular location.

2. Means for distinguishing photopeaks of energy received across an energy band from background energy as defined in claim 1 in which said energy is continuously received from a plurality of juxtaposed and continuous physical locations, means for storing predetermined periods of said energy relating to said plurality of physical locations and means for applying serially said predetermined periods of said energy both said means for distinguishing as set forth in paragraphs (b) and (c) of claim 1.

3. means for distinguishing photopeaks of energy received across an energy band from background energy as defined in claim 2, in which said output signal is of the form indicative of levels of radiation emissive minerals sequentially related directly to said plurality of physical locations.

4. Means for distinguishing photopeaks of energy received across an energy band from background energy at a particular physical location as defined in claim 1 or 2, further including means for displaying the output signal as an amplitude as a function of the energy spectrum.

5. Means for distinguishing photopeaks of energy received across an energy band from background energy as defined in claim 3 further including means for continuously displaying the output signal as an amplitude as a function of the energy spectrum.

6. Means for distinguishing photopeaks of energy received across an energy band from Compton background energy at a particular physical location as defined in claim 1, in which the received energy is passed through a filter to obtain said integrated value of Compton energy, in which the filter has the transfer characteristics $$\frac{K_0 A_N + K_1(A_{N+1} + A_{N-1}) + K_2(A_{N+2} + A_{N-2}) + K_3(A_{N+3} + A_{N-3})}{K_0 + 2(K_1 + K_2 + K_3)}$$

where
$A_N$ is the received energy level in a particular window,
N is the window number and
$K_0$, $K_1$, $K_2$ and $K_3$ are constants.

7. Means for distinguishing photopeaks of energy received across an energy band from Compton background energy at a particular physical location as defined in claim 6 in which
$K_0 = 1.0$
$K_1 = 0.9$
$K_2 = 0.75$ and
$K_3 = 0.5$.

8. Means for distinguishing full energy absorption peaks received across an energy band from background energy at a particular physical location comprising:
   (a) means for receiving a gamma ray energy spectrum of radiation,
   (b) means for distinguishing full energy absorption peaks of said received energy,
   (c) means for filtering the received energy,
   (d) means for defining a lower and an upper filtered spectrum window boundary of at least one of said peaks,
   (e) means for determining the amplitude of the energy at said boundaries,
   (f) means for integrating the energy between said boundaries, with a predetermined energy change between the energy amplitudes at said boundaries, to obtain a signal representative of the background energy,
   (g) means for integrating the filter-d energy amplitude between said boundaries, to obtain a total photopeak area signal, and
   (h) means for subtracting the signal representative of the background energy from the total photopeak area signal to obtain a signal representative of the net photopeak area within the spectrum window.

9. Means for distinguishing full energy absorption peaks received across an energy band from background energy as defined in claim 8, further including means for continuously displaying updated said net photopeak areas as an ordinate bar on an abcissa representative of the spectrum window as the means for receiving radiation is passed over a land area.

10. Means for distinguishing full energy absorption peaks received across an energy band from background energy as defined in claim 9 in which the means for receiving radiation is comprised of a spectrometer.

11. Means for distinguishing full energy absorption peaks received across an energy band from background energy as defined in claim 10 in which the means for defining the upper and lower boundaries includes means for differentiating the received energy on the upper and lower energy sides of the energy absorption peak and determining spectrum locations where the energy curve changes sign.

12. Means for distinguishing full energy absorption peaks received across an energy band from background energy as defined in claim 8 in which the filter means is a recursive filter.

13. Means for distinguishing full energy absorption peaks received across an energy band from background energy as defined in claim 9, 10 or 12 further including an analog-to-digital converter having its input connected to the output of the spectrometer, a microcomputer having its data input connected to the output of the analog-to-digital converter, an oscilloscope displaying means having its input connected to the output of the microcomputer, the microcomputer being adapted to form said means for filtering, said means for defining said boundaries, said means for determining the amplitude of the energy at said boundaries, said means for integrating, said means for subtracting, and said further means for driving said displaying means.

14. A method for distinguishing full energy absorption peaks across an energy band from background energy comprising:

(a) receiving an energy spectrum signal at least within the energy band to be distinguished,
(b) filtering the signal,
(c) defining at least one of said peaks,
(d) defining upper and lower spectrum boundaries to said one peak,
(e) determining the amplitudes of said filtered signal at said boundaries,
(f) assigning a predetermined change in amplitude of said filtered signal between said amplitudes of said filtered signal,
(g) integrating the signal between said boundaries from said amplitudes and predetermined change in amplitude to obtain a signal representative of background energy,
(h) integrating the filtered signal between said boundaries to obtain a signal representative of total photopeak area,
(i) subtracting the background energy signal from the total photopeak area signal to obtain a net photopeak signal.

15. A method of distinguishing full energy absorption peaks across an energy band from background energy as defined in claim 14, in which said predetermined change in amplitude is linear.

16. A method of distinguishing full energy absorption peaks across an energy band from background energy as defined in claim 14, in which said predetermined change in amplitude is cubic.

17. A method of distinguishing full energy absorption peaks across an energy band from background energy as defined in claim 14, in which said predetermined change in amplitude is a smoothed polynomial curve.

18. A method of distinguishing full energy absorption peaks across an energy band from background energy as defined in claim 14, 15, or 17, further including the step of displaying the photopeak signal as a function of a spectrum window.

* * * * *